United States Patent
Son et al.

(10) Patent No.: US 9,291,762 B2
(45) Date of Patent: Mar. 22, 2016

(54) BACKLIGHT ASSEMBLY AND LIQUID CRYSTAL DISPLAY DEVICE INCLUDING THE SAME

(71) Applicant: Samsung Display Co., Ltd., Yongin (KR)

(72) Inventors: Jun-Hee Son, Cheonan-si (KR); Jeoung-Gwen Lee, Suwon-si (KR); Tae-Hyung Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 167 days.

(21) Appl. No.: 14/172,003

(22) Filed: Feb. 4, 2014

(65) Prior Publication Data
US 2014/0176877 A1 Jun. 26, 2014

Related U.S. Application Data

(63) Continuation of application No. 11/870,691, filed on Oct. 11, 2007, now Pat. No. 8,665,389.

(30) Foreign Application Priority Data

Oct. 12, 2006 (KR) .................. 10-2006-0099498

(51) Int. Cl.
*G02F 1/1333* (2006.01)
*F21V 7/04* (2006.01)
*F21V 8/00* (2006.01)

(52) U.S. Cl.
CPC ............ *G02B 6/0013* (2013.01); *G02B 6/0086* (2013.01); *G02F 2001/133314* (2013.01)

(58) Field of Classification Search
CPC .......................................... G02F 2001/133314
See application file for complete search history.

(56) References Cited

U.S. PATENT DOCUMENTS

| 6,667,780 B2 | 12/2003 | Cho |
| 6,919,938 B2 | 7/2005 | Choi et al. |

(Continued)

FOREIGN PATENT DOCUMENTS

| CN | 1797124 | 7/2006 |
| KR | 1020030073122 | 9/2003 |

(Continued)

OTHER PUBLICATIONS

Final Office Action issued in U.S. Appl. No. 11/870,691, dated Jul. 23, 2010.

(Continued)

*Primary Examiner* — Jerry M Blevins
*Assistant Examiner* — Erin Chiem
(74) *Attorney, Agent, or Firm* — H.C. Park & Associates, PLC

(57) ABSTRACT

Provided is a backlight assembly and a liquid crystal display including: a light source; a light guide plate; and a bottom chassis comprising an accommodating portion, a light source cover configured to accommodate the light source, a first sidewall, and a second sidewall, the accommodating portion comprising a first accommodating portion and a second accommodating portion detachably coupled with each other, wherein the light source cover is formed on a first edge of the first accommodating portion, the first sidewall is formed on a second edge of the first accommodating portion, and the second sidewall is formed on an edge of the second accommodating portion.

18 Claims, 12 Drawing Sheets

(56) References Cited

U.S. PATENT DOCUMENTS

| | | |
|---|---|---|
| 7,033,063 B2 | 4/2006 | Cha et al. |
| 7,153,018 B2 | 12/2006 | Nomura |
| 2002/0054249 A1 | 5/2002 | Ryu et al. |
| 2003/0223215 A1 | 12/2003 | Shin et al. |
| 2004/0196413 A1 | 10/2004 | Satonaka |
| 2004/0240195 A1 | 12/2004 | Tsai |
| 2005/0099790 A1 | 5/2005 | Kang et al. |
| 2005/0122740 A1 | 6/2005 | Cha et al. |
| 2005/0152157 A1 | 7/2005 | Nomura |
| 2006/0002137 A1 | 1/2006 | Kim et al. |
| 2006/0203144 A1 | 9/2006 | Kim |
| 2006/0203519 A1 | 9/2006 | Shin et al. |

FOREIGN PATENT DOCUMENTS

| | | |
|---|---|---|
| KR | 1020030092879 | 12/2003 |
| KR | 1020060092598 | 8/2006 |
| TW | 466465 | 12/2001 |
| TW | 2005-21531 | 7/2005 |
| TW | 2005-37189 | 11/2005 |
| TW | 2006-18714 | 6/2006 |
| WO | 03102680 | 12/2003 |

OTHER PUBLICATIONS

Non-Final Office Action issued in U.S. Appl. No. 11/870,691, dated Sep. 17, 2010.
Final Office Action issued in U.S. Appl. No. 11/870,691, dated Apr. 14, 2011.
Non-Final Office Action issued in U.S. Appl. No. 11/870,691, dated Dec. 23, 2011.
Final Office Action issued in U.S. Appl. No. 11/870,691, dated May 4, 2012.
Non-Final Office Action issued in U.S. Appl. No. 11/870,691, dated Aug. 31, 2012.
Notice of Allowance issued in U.S. Appl. No. 11/870,691, dated Apr. 10, 2013.
Notice of Allowance issued in U.S. Appl. No. 11/870,691, dated Oct. 8, 2013.
Extended European Search Report issued in E.P. Application No. 07020029.0, dated Feb. 22, 2008.
Non-Final Office Action issued in U.S. Appl. No. 11/870,691, dated Dec. 29, 2008.
Final Office Action issued in U.S. Appl. No. 11/870,691, dated Jul. 23, 2009.
Non-Final Office Action issued in U.S. Appl. No. 11/870,691, dated Jan. 25, 2010.

BACKLIGHT ASSEMBLY AND LIQUID CRYSTAL DISPLAY DEVICE INCLUDING THE SAME

CROSS-REFERENCE TO RELATED APPLICATIONS

This application is a continuation of U.S. patent application Ser. No. 11/870,691, filed on Oct. 11, 2007 and claims priority from and the benefit of Korean Patent Application No. 10-2006-0099498, filed on Oct. 12, 2006, both of which are hereby incorporated by reference for all purposes as if fully set forth herein.

BACKGROUND OF THE INVENTION

1. Field

The present disclosure relates to a backlight assembly and a liquid crystal display device including the same. More particularly, the present disclosure relates to a backlight assembly and a liquid crystal display device including the backlight assembly, where the liquid crystal display device is slim, lightweight, and requires low manufacturing costs because the device integrates a bottom chassis and a lamp cover.

2. Discussion of the Background

Liquid crystal display ("LCD") devices have increasingly been used in a broad range of applications because LCDs are lightweight, compact, and require low power consumption. An LCD device includes an LCD module and a driving circuit for driving the LCD module.

The LCD module includes an LCD panel including liquid crystal cells arranged in a matrix format between two transparent substrates, and a backlight assembly which emits light to the LCD panel.

The backlight assembly includes a lamp for emitting light to the LCD panel, a lamp housing for covering the lamp, a light guide plate for guiding incident light from the lamp toward the LCD panel, a reflection sheet located on the inner surface of the light guide plate, and a plurality of optical sheets stacked on the light guide plate.

Although there are various types of backlight assemblies, a backlight assembly including a lamp cover for seating the lamp is commonly used. However, stacking the lamp cover on the backlight assembly increases the thickness of the LCD device. This structure increases the LCD device's manufacturing costs because the LCD device includes the lamp cover for preventing light emitted from the lamp from proceeding thereunder and a reflection material coated on the lamp cover for guiding the light toward the light guide plate.

SUMMARY OF THE INVENTION

The present disclosure provides a backlight assembly and an LCD device including the backlight assembly, where the liquid crystal display device is slim, lightweight, and requires low manufacturing costs because the device integrates a bottom chassis and a lamp cover.

Additional features of the invention will be set forth in the description which follows, and in part will be apparent from the description, or may be learned by practice of the invention.

The present application discloses a backlight assembly, comprising: a light source; a light guide plate; and a bottom chassis comprising an accommodating portion, a light source cover configured to accommodate the light source, and first and second sidewalls, the accommodating portion comprising a first accommodating portion and a second accommodating portion configured to separatably engage with each other, wherein the light source cover is formed on a first edge of the first accommodating portion, the first sidewall is formed on a second edge of the first accommodating portion, and the second sidewall is formed on an edge of the second accommodating portion.

The present application also discloses a liquid crystal display device, comprising: a liquid crystal display panel; a driving circuit to drive the liquid crystal display panel; a light source to provide the liquid crystal display panel with light; a light guide plate to guide the light emitted from the light source toward the liquid crystal display panel; and a bottom chassis comprising an accommodating portion, a light source cover configured to accommodate the light source, and first and second sidewalls, the accommodating portion comprising a first accommodating portion and a second accommodating portion configured to separatably engage with each other; and a top chassis enclosing edge portions of the liquid crystal display panel and covering side surfaces of the bottom chassis, wherein the light source cover is formed on a first edge of the first accommodating portion, the first sidewall is formed on a second edge of the first accommodating portion, and the second sidewall is formed on an edge of the second accommodating portion.

The present application discloses a backlight assembly, comprising: a lamp; a light guide plate configured to guide light emitted from the lamp; an optical sheet disposed on the light guide plate; and a chassis configured to accommodate the lamp, the light guide plate, and the optical sheet, the chassis comprising a first chassis and a second chassis, wherein the first chassis and the second chassis are configured to be separatably coupled together such that an upper surface of the first chassis is coplanar with an upper surface of the second chassis, the coplanar upper surfaces forming an accommodating portion, and wherein the light source cover is formed on a first edge of the first chassis, the first sidewall is formed on a second edge of the first chassis, and the second sidewall is formed on an edge of the second chassis.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention, and together with the description serve to explain the principles of the invention.

DETAILED DESCRIPTION OF THE INVENTION

Figure 1:
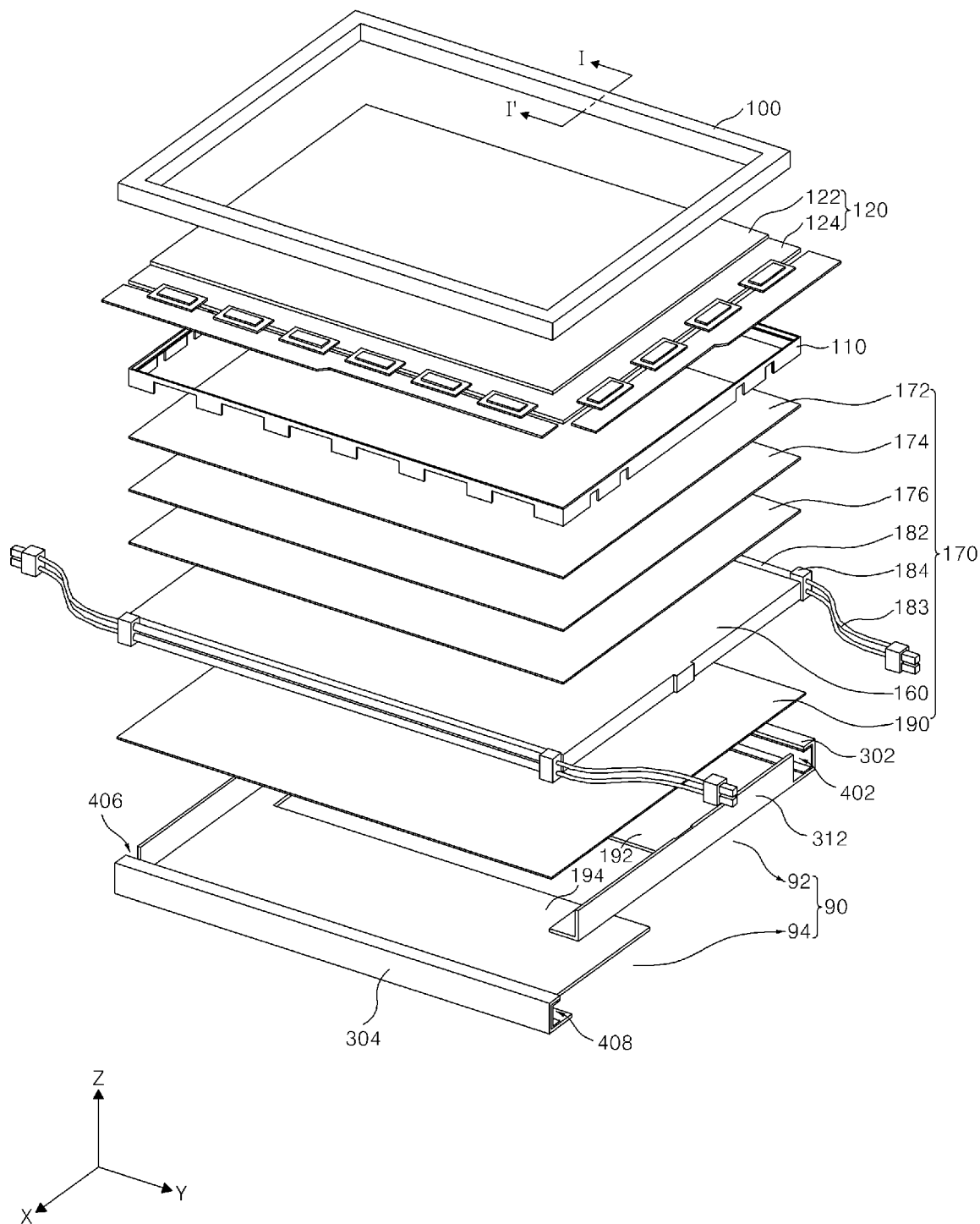
FIG. 1 is an exploded perspective view showing an LCD according to an exemplary embodiment of the present invention.

Various exemplary embodiments of the invention are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative size of layers and regions may be exaggerated for clarity. Like reference numerals in the drawings denote like elements.

It will be understood that when an element such as a layer, film, region or substrate is referred to as being "on", "connected to", or "coupled to" another element or layer, it can be directly on, directly connected to, or directly coupled to the other element or layer, or intervening elements or layers may also be present. In contrast, when an element is referred to as being "directly on", "directly connected to", or "directly coupled to" another element or layer, there are no intervening elements or layers present.

Figure 2:
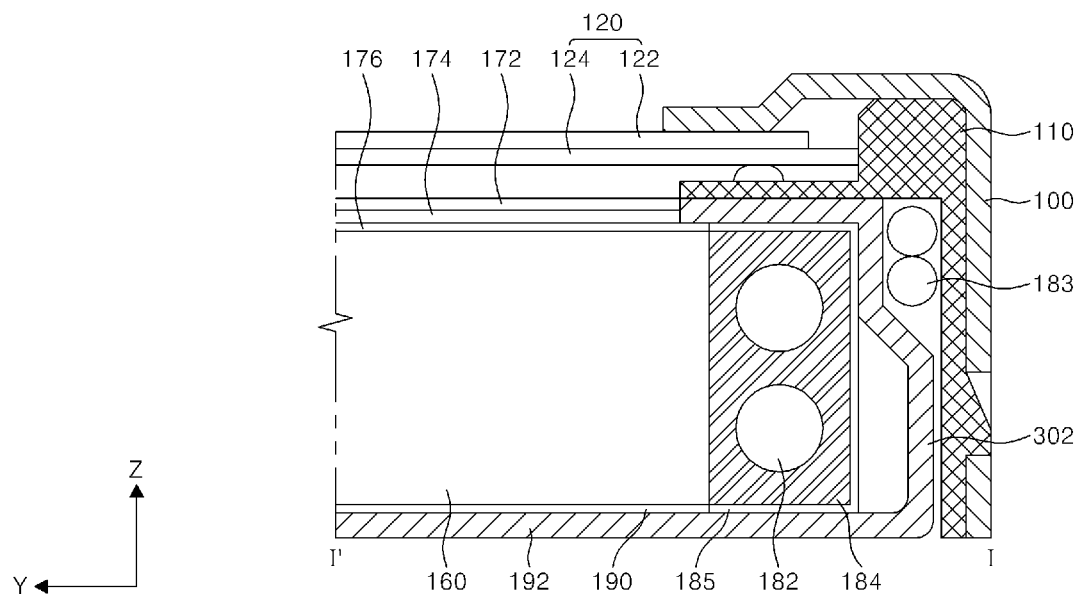
FIG. 2 is a cross-sectional view taken along line I-I' of FIG. 1.

FIG. 1 is an exploded perspective view showing an LCD device according to an exemplary embodiment of the present invention, and FIG. 2 is a cross-sectional view taken along line I-I' of FIG. 1.

The LCD device shown in FIG. 1 and FIG. 2 includes an LCD panel 120, a backlight assembly 170, a mold frame 110, a top chassis 100, and a bottom chassis 90 divided into a first bottom chassis 92 and a second bottom chassis 94.

The LCD panel 120 includes a thin film transistor ("TFT") substrate 124, and a color filter substrate 122 facing the TFT substrate 124. Liquid crystals (not shown) are disposed between the TFT substrate 124 and the color filter substrate 122. The LCD panel 120 displays an image by controlling the light transmissivity of the liquid crystals using TFTs switching element that are arranged in a matrix format. The color filter substrate 122 includes RGB color filters thereon for generating a desired color. Therefore, light transmitted through the liquid crystals is expressed as a desired color through the RGB color filters for displaying an image.

The top chassis 100 covers an upper edge portion of the LCD panel 120, and side surfaces of the top chassis 100 are formed to cover side surfaces of the mold frame 110 and the bottom chassis 90.

The mold frame 110 accommodates the LCD panel 120 and the backlight assembly 170 to prevent movement thereof and to absorb an outside impact on the LCD panel 120 and the backlight assembly 170. The mold frame 110 may be formed of synthetic resins or plastics to be insulated from a driving circuit.

The backlight assembly 170 includes a lamp 182, a reflection sheet 190, a light guide plate 160, a diffusion sheet 176, a prism sheet 174, and a protection sheet 172 and supplies light to the LCD panel 120.

The lamp 182 may be comprised of at least one cold cathode fluorescence lamp having a bar shape for generating light, a lamp electrode line 183 connected to both ends of the lamp 182 for applying a driving voltage. Alternatively, the at least one cold cathode fluorescent lamp may be replace with a plurality of light emitting diodes for generating light. The lamp 182 may be fixed by a lamp holder 184.

The sheets include the diffusion sheet 176, the prism sheet 174, and the protection sheet 172. The diffusion sheet 176 and the prism sheet 174 are combined with two or three sheets, and diffuse and converge light emitted from the light guide plate 182, improving brightness and a viewing angle of the LCD device. The protection sheet 172 may be stacked on the diffusion sheet 176 or the prism sheet 174 for protecting sheets sensitive to dust or scratching and for preventing movement of the sheets and the backlight assembly 170.

Figure 8:
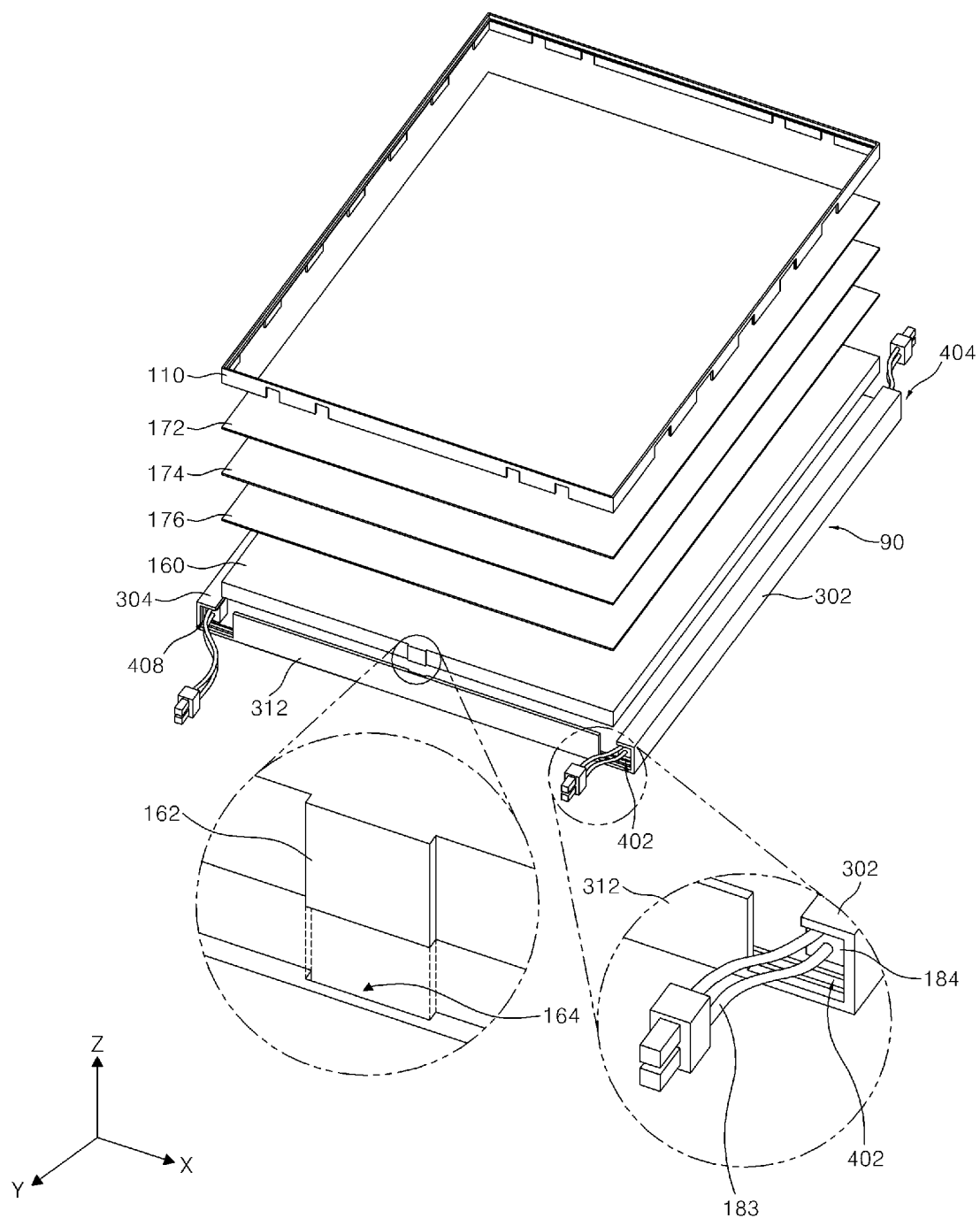
FIG. 8 is a perspective view showing a backlight assembly shown in FIG. 1.

The light guide plate 160 uniformly distributes light emitted from the lamp 182 across the entire surface of the light guide plate 160, and then guides the light toward the LCD panel 120. For doing so, the light guide plate 160 may be formed of a transparent, thermal resistant polycarbonate, or a transparent acryl resin with a high refraction index. The light guide plate 160 has a protrusion portion 162 formed on at least one side surface thereof as shown in FIG. 8. The protrusion portion 162 of the light guide plate 160 is fixed to a groove 164 of an inner sidewall 314 of the bottom chassis 90.

Referring back to FIG. 1, the reflection sheet 190 reflects light emitted from a lower portion of the light guide plate 160 back toward the light guide plate 160. For doing so, the reflection sheet 190 may have a basic material coated with a highly reflective material. The basic material may include aluminum (Al), polyethylene terephthalate (PET), etc. and the reflective material may include silver (Ag), titanium (Ti), etc. The bottom chassis 90 is divided into the first bottom chassis 92 and the second bottom chassis 94.

Figure 3:
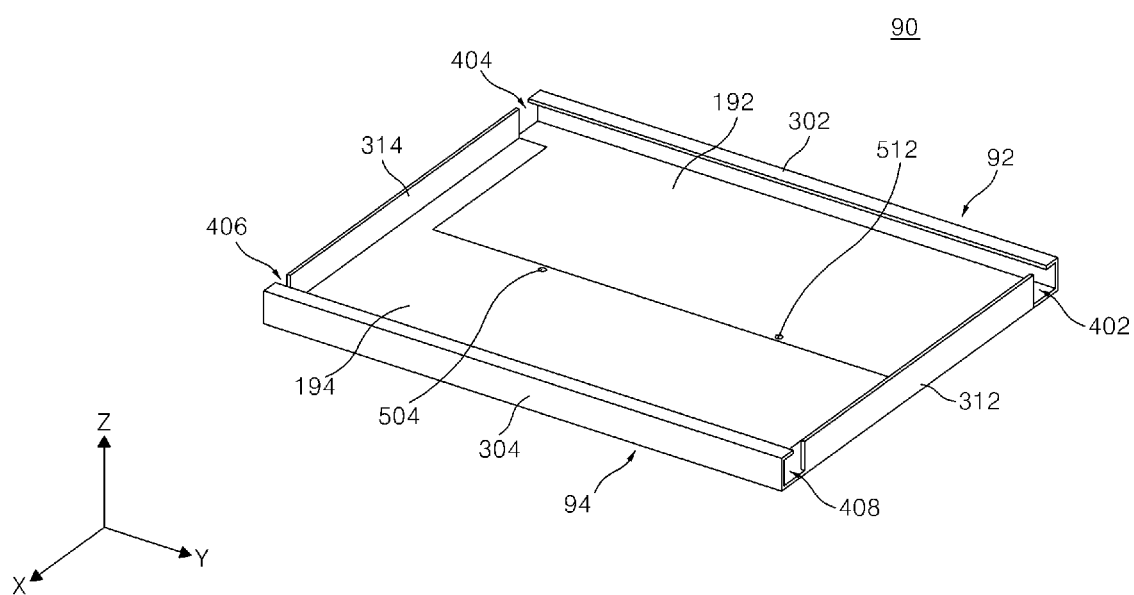
FIG. 3 is a graphical view showing a first bottom chassis engaged with a second bottom chassis of FIG. 1.

FIG. 3 shows a graphical view of the first bottom chassis 92 engaged with the second bottom chassis 94 of FIG. 1. The first bottom chassis 92 includes a first accommodating portion 192, a first inner sidewall 312, a first lamp cover 302, and first and second opening portions 402 and 404. The second bottom chassis 94 includes a second accommodating portion 194, a second inner sidewall 314, a second lamp cover 304, and third and fourth opening portions 406 and 408.

The first bottom chassis 92 and the second bottom chassis 94 are engaged to face each other. The first accommodating portion 192 of the first bottom chassis 92 and the second accommodating portion 194 of the second bottom chassis 94 provide an accommodating space, which accommodates the light guide plate 160, the optical sheets 172, 174 and 176, and the reflection sheet 190. The first accommodating portion 192 and the second accommodating portion 194 are formed to be symmetrical to each other, and their facing surfaces may be formed in an 'L' shape and a reverse 'L' shape.

Figure 4A:
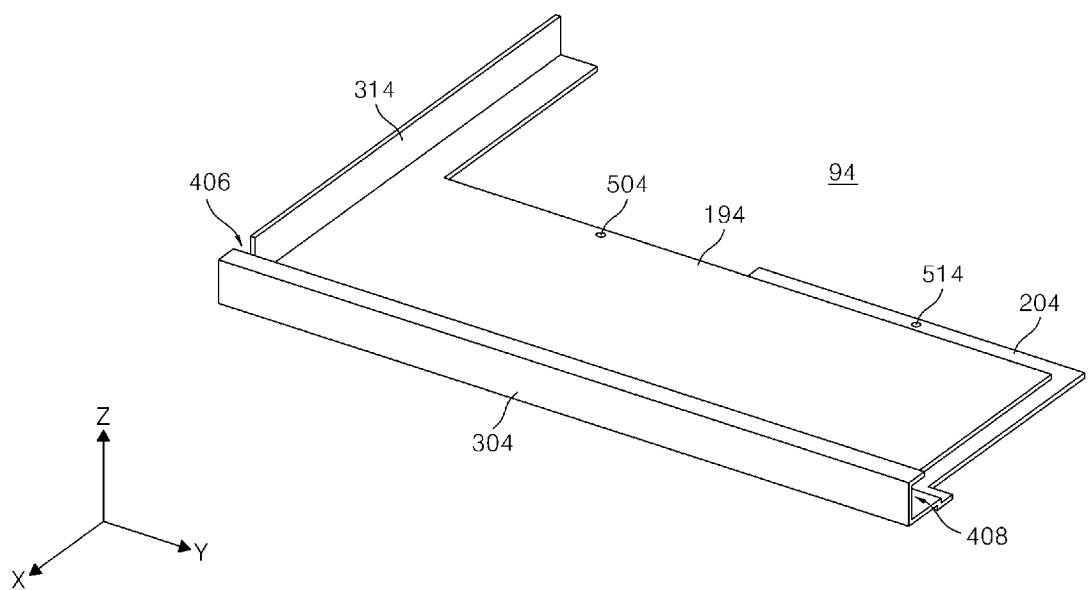
FIG. 4A, FIG. 4B, FIG. 5A, FIG. 5B, FIG. 5C, FIG. 5D, FIG. 6A and FIG. 6B are graphical views showing the first bottom chassis and the second bottom chassis of FIG. 3 according to exemplary embodiments of the present invention.
Figure 4B:
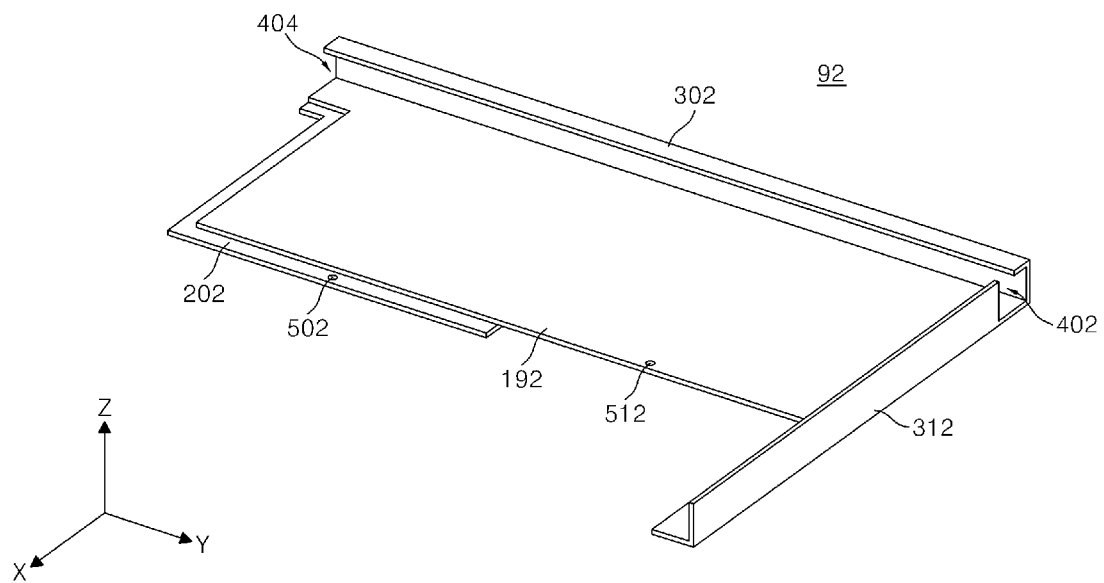

FIG. 4A and FIG. 4B show graphical views of exemplary embodiments of the second bottom chassis 94 and the first bottom chassis 92 of FIG. 3, respectively.

Referring to FIG. 4A and FIG. 4B, the first bottom chassis 92 includes a first mounting portion 202 formed to overlap and engage an area of the second accommodating portion 194, a first mounting hole 502, and a first accommodating hole 512. The second bottom chassis 94 includes a second mounting portion 204 formed to overlap and engage an area of the first accommodating portion 192, a second accommodating hole 504, and a second mounting hole 514. The first accommodating portion 192 forms the first mounting portion 202 such that a stepped portion is formed at an area in contact with the second accommodating portion 194.

The first mounting portion 202 is formed from the first accommodating portion 192 in a single body and second mounting portion 204 is formed from the second accommodating portion 194 in a single body.

When the first bottom chassis 92 engages the second bottom chassis 94, the first mounting portion 202 engages and overlaps the second accommodating portion 194 at an area equivalent to the width of the first mounting portion 202, and the second mounting portion 204 engages and overlaps the first accommodating portion 192 at an area equivalent to the width of the second mounting portion 204. In this manner, the engagement of the first bottom chassis 92 and the second bottom chassis 94 may prevent light emitted from the lamp 182 from leaking through a gap between the facing surfaces of the first accommodating portion 192 and the second accommodating portion 194. Further, the intersection and overlapping of the first accommodating portion 192 and the second accommodating portion 194 strengthens the engagement between the first bottom chassis 92 and the second bottom chassis 94.

FIG. 5A, FIG. 5B, FIG. 5C and FIG. 5D show graphical views of exemplary embodiments of the first bottom chassis 92 and the second bottom chassis 94 of FIG. 3, respectively.

Figure 5A:
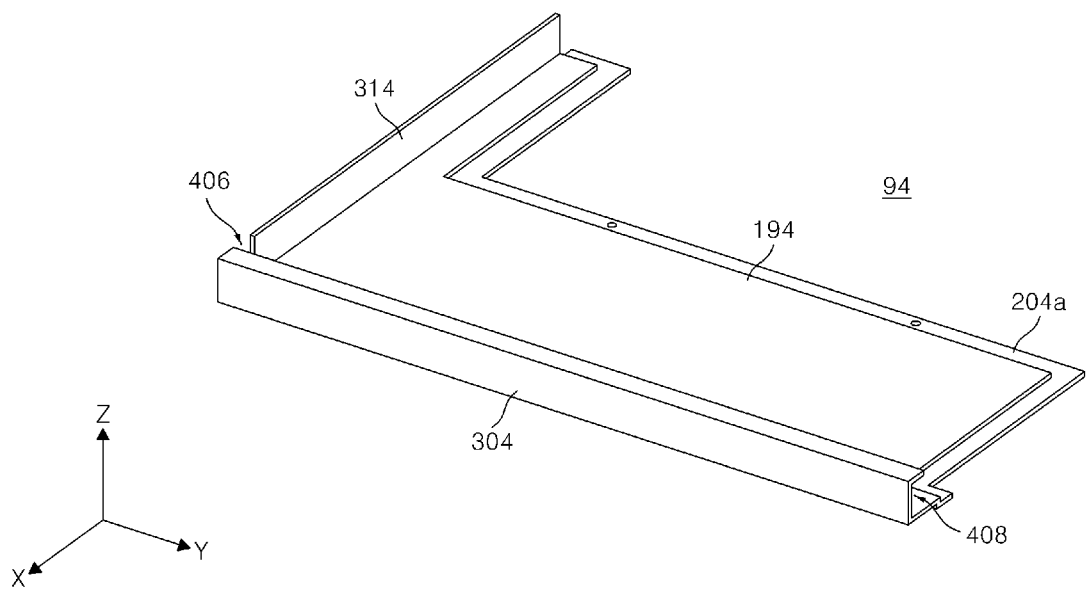
Figure 5B:
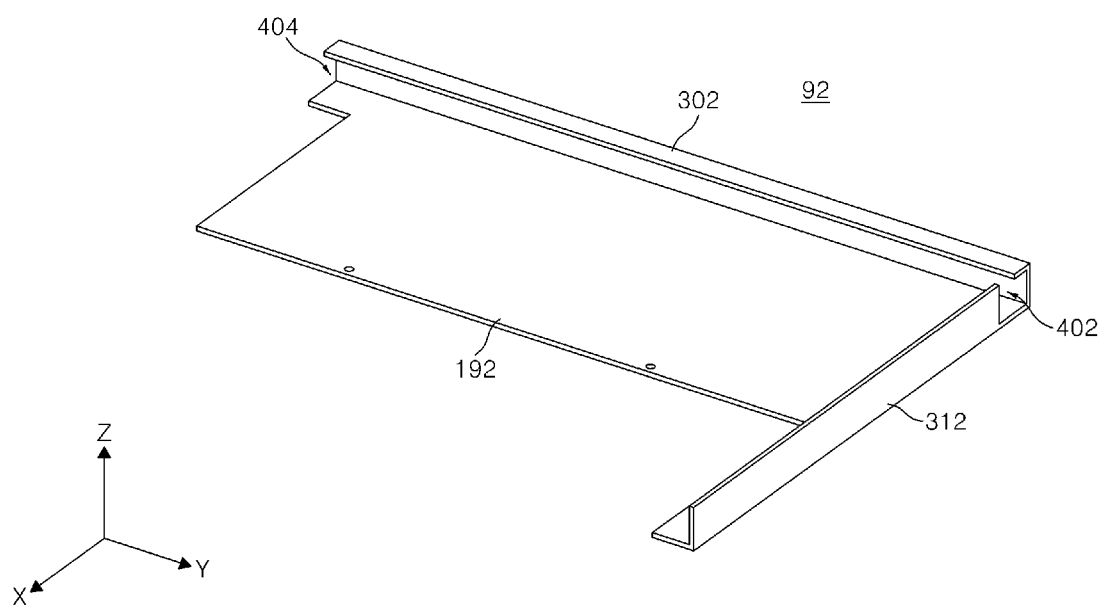
Figure 5C:
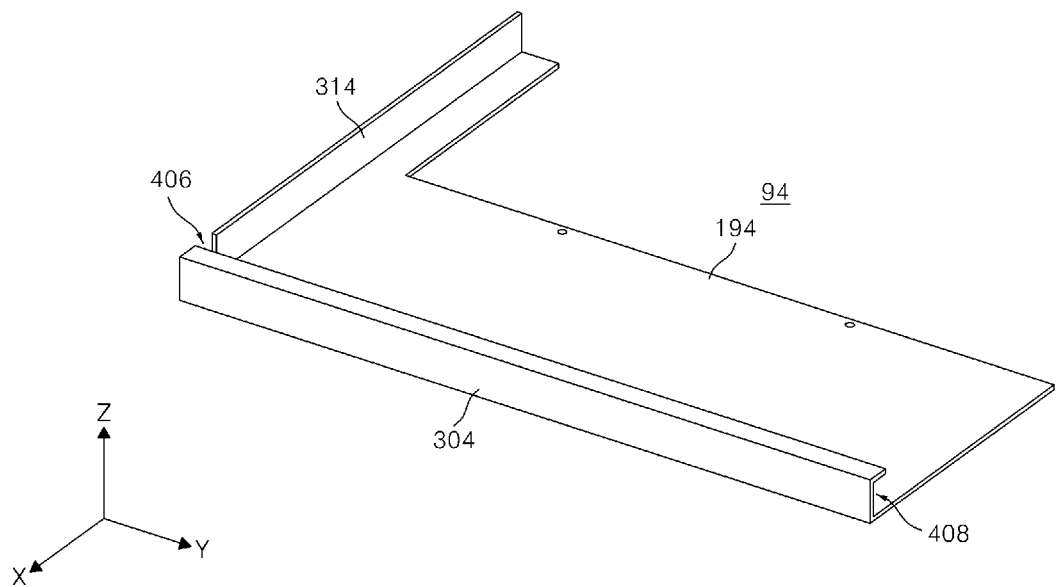
Figure 5D:
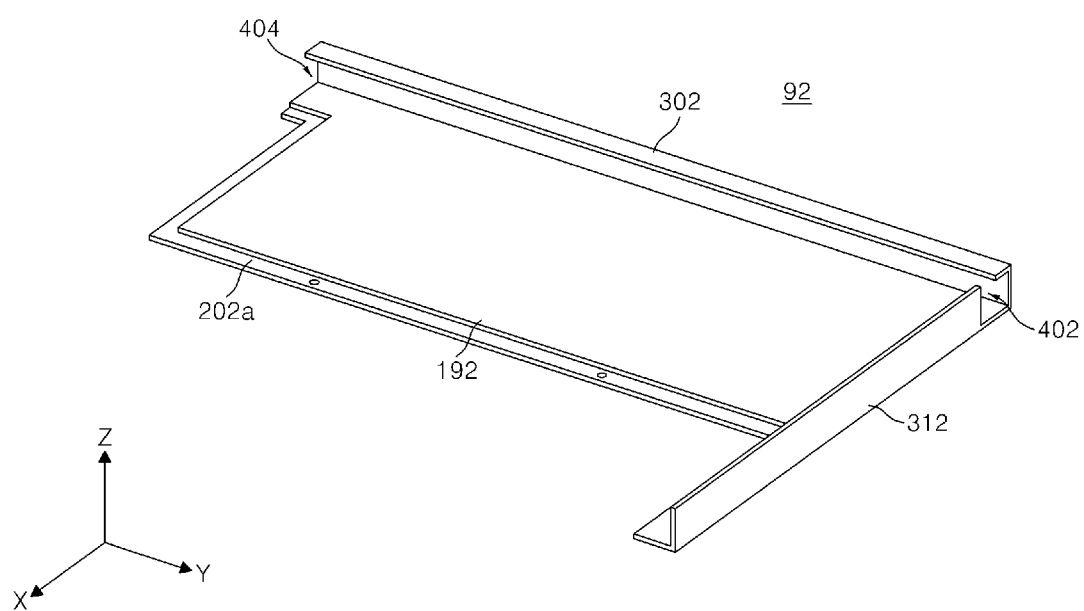

As shown in FIG. 5A and FIG. 5B, a second mounting portion 204a of the second bottom chassis 94 is formed such that a stepped portion is formed across the entire width of the second bottom chassis 94 and in contact with the first accommodating portion 192 across the entire width of the first bottom chassis 92. The first accommodating portion 192 is also formed to overlap and engage the second accommodating portion 194 across the entire width of the second bottom chassis 94. Alternatively, as shown in FIG. 5C and FIG. 5D, the first accommodating portion 192 may form a first mounting portion 202a to overlap and engage the second accommodating portion 194 across the entire width of the second bottom chassis 94.

The first mounting portion 204a is formed from the first accommodating portion 192 in a single body, and the second mounting portion 202a is formed from the second accommodating portion 194 in a single body.

Figure 6A:
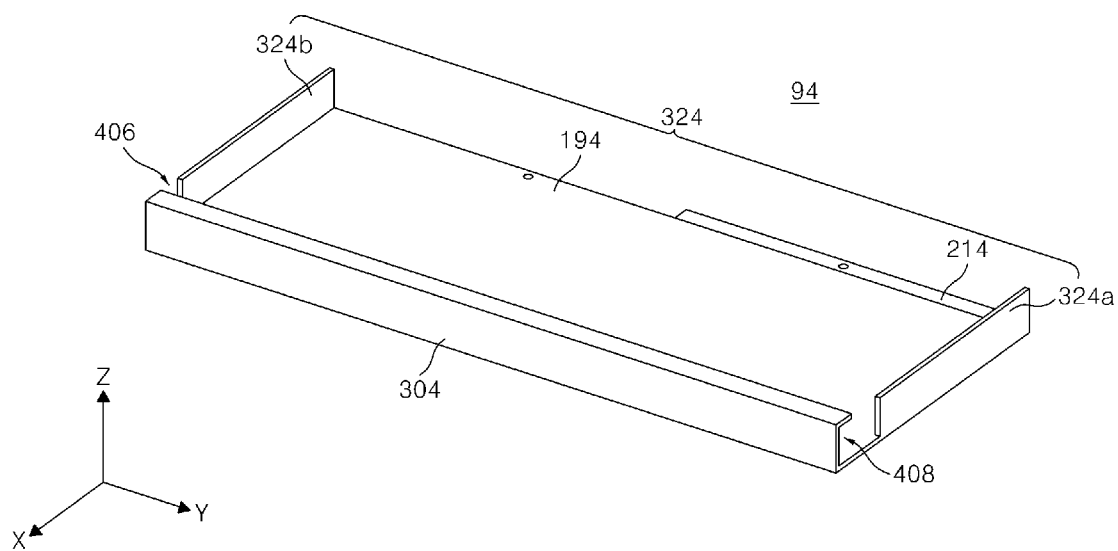
Figure 6B:
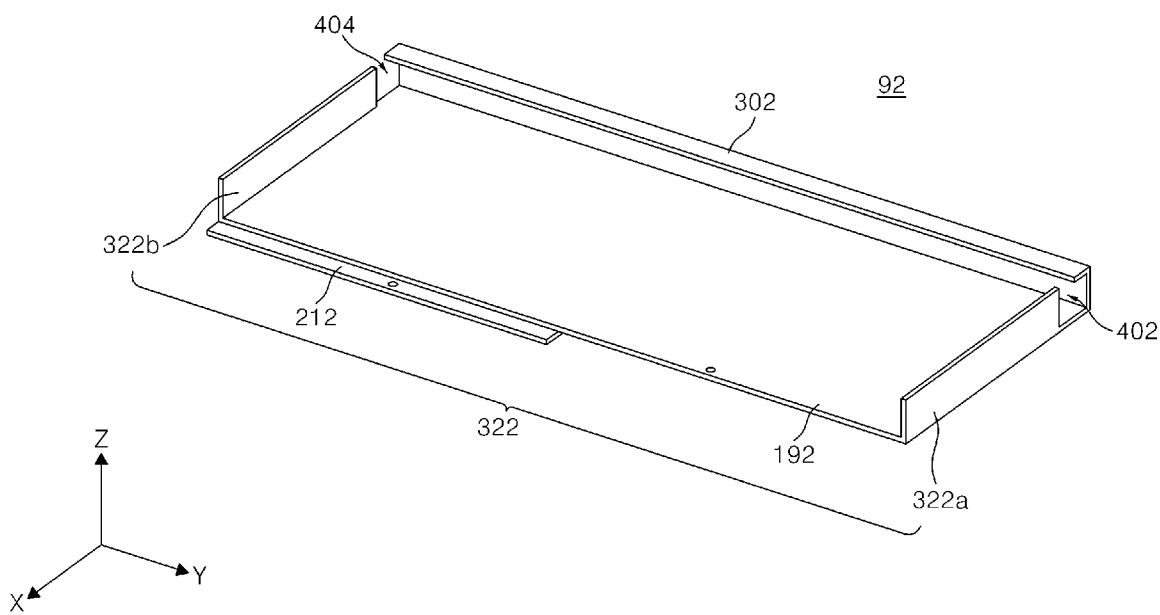

FIG. 6A and FIG. 6B show graphical views of exemplary embodiments of the second bottom chassis 94 and the first bottom chassis 92 of FIG. 3, respectively.

As shown in FIG. 6A and FIG. 6B, the first mounting portion 212 is arranged under the first accommodating portion 192 to form a stepped portion and overlaps and engages an area in contact with the second accommodating portion 194. In other words, the second accommodating portion 194 is mounted on the first mounting portion 212 which partially extends from the first accommodating portion 192 and forms a stepped portion by a constant distance. Likewise, the second mounting portion 214 partially extends from the second accommodating portion 194 and forms a stepped portion by a constant distance. The first mounting portion 212 is formed from the first accommodating portion 192 in a single body, and the second mounting portion 214 is formed from the second accommodating portion 194 in a single body.

Alternatively, the first accommodating portion 192 includes a first inner sidewall 322 perpendicular to the first accommodating portion 192, and the second accommodating portion 194 includes a second inner sidewall 324 perpendicular to the second accommodating portion 194. The first inner sidewall 322 includes sidewalls 322a and 322b formed at both sides of the first accommodating portion 192, and the second inner sidewall 324 includes sidewalls 324a and 324b formed at the both sides of the second accommodating portion 194.

Figure 7:
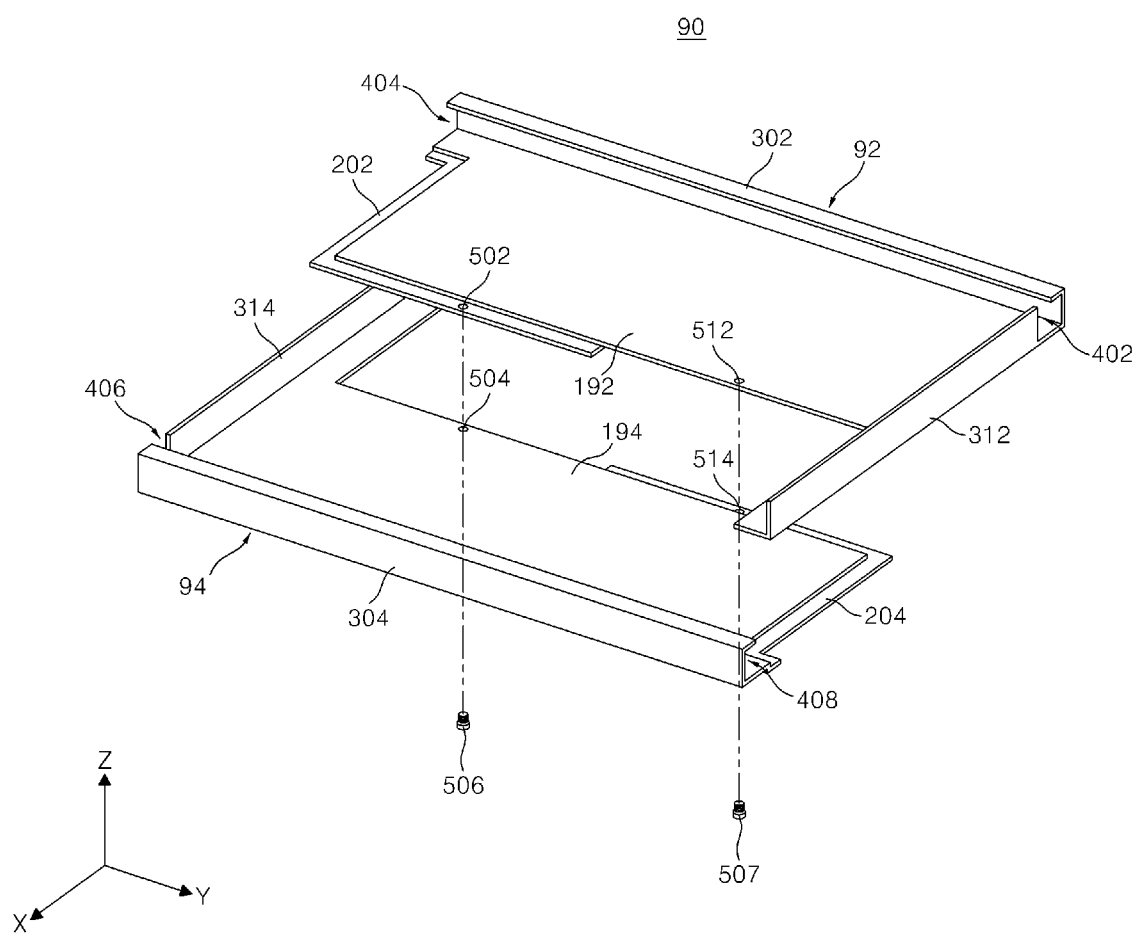
FIG. 7 is a graphical view showing a method of engaging the first bottom chassis and the second bottom chassis shown in FIG. 4A and FIG. 4B.

As shown in FIG. 7, the overlap and engagement of the first accommodating portion 192 to the second accommodating portion 194 may be strengthened by using screws 506 and 507. A screwing method will be described with reference to FIG. 4A and FIG. 4B as previously described above. The first mounting hole 502 formed in the first mounting portion 202 and the second accommodating hole 504 formed at a position corresponding to the first mounting hole 502 are aligned and secured by the first screw 506. The second mounting hole 514 formed in the second mounting portion 204 and the first accommodating hole 512 formed at a position corresponding to the second mounting hole 514 are aligned and secured by the second screw 507. Alternatively, a plurality of screws may be used at desired positions for improving a securing strength. In this way, the overlap and engagement of the first accommodating portion 192 and the second accommodating portion 194 may prevent light from leaking toward the lower portion of the light guide plate 160. Further, the light guide plate 160, the optical sheets 172, 174, and 176, and the reflection sheets 186 and 188 may be more easily accommodated by dividing the bottom chassis 90 into the first bottom chassis 92 and the second bottom chassis 94.

As shown in FIG. 8, the first inner sidewall 312 accommodates the light guide plate 160, the optical sheets 172, 174, and 176, and the reflection sheets 186 and 188. The light guide plate 160 is fixed by the first inner sidewall 312. The groove 164 is formed at a position corresponding to the protrusion portion 162 of the light guide plate 160 in the first inner sidewall 312 perpendicular to the first accommodating portion 192 (refer to FIG. 3, FIG. 4A and FIG. 4B). Accordingly, by combining the groove 164 of the first inner sidewall 312 with the protrusion 162 of the light guide plate 160, the securing strength of the light guide plate 160 and the bottom chassis 90 may be improved. Alternatively, the protrusion portion 162 may be formed on the second inner sidewall 314, and the groove 164 may be formed on the light guide plate 160 at a position corresponding to the protrusion portion 162. Like the first inner sidewall 312, the second inner sidewall 314 may have a groove 164 or a hole into which the protrusion portion 162 of the light guide plate 160 is inserted.

Figure 9:
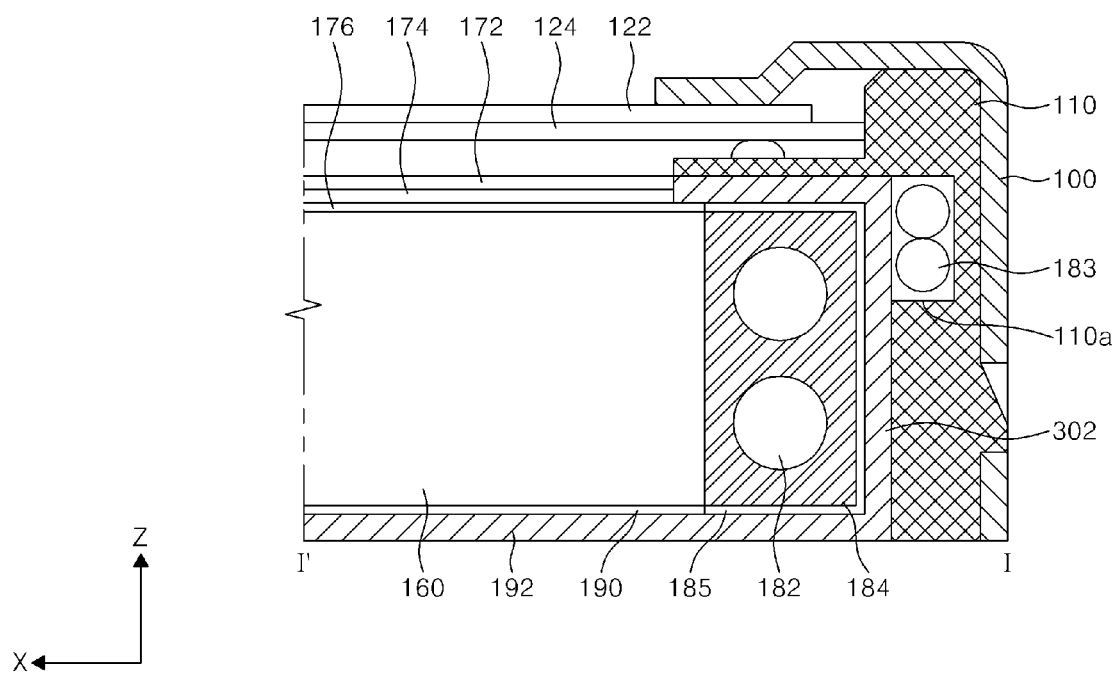
FIG. 9 is a cross-sectional view of the LCD device including a lamp cover and a mold frame according to an exemplary embodiment of the present invention.

The first lamp cover 302 and the second lamp cover 304 extend from one side surfaces of the first bottom chassis 92 and the second bottom chassis 94, respectively, and are bent to enclose a lamp reflection layer 185 and the lamp 182 fixed by the lamp holder 184. The first lamp cover 302 and the second lamp cover 304 are formed in a 'C' shape, for example, to accommodate the lamp 182 and the lamp reflection layer 185. Accordingly, the first lamp cover 302 and the second lamp cover 304 accommodate the lamp 182. The lamp electrode line 183 for applying a driving voltage to the lamp 182 is exposed to an external circuit and is disposed between the first and second lamp covers 302 and 304 and the mold frame 110. More specifically, as shown in FIG. 2, the lamp electrode line 183 disposed between the first lamp cover 302 and the mold frame 110 is supported and secured by bending side surface of the first lamp cover 302. Further, as shown in FIG. 9, when the side surface of the first lamp cover 302 is flat, a protrusion portion 110a of the mold frame 110 is formed between the first lamp cover 302 and the mold frame 110 to support and fix the lamp electrode line 183. Meanwhile, the first lamp cover 302 may be formed of a material with high reflectivity for reflecting light generated from the lamp 182 toward the light guide plate 160, thereby improving light efficiency of the LCD device.

The lamp reflection layer 185 may be formed of a material with high reflectivity on an inner surface of the first lamp cover 302. The lamp reflection layer 185 reflects light emitted from the lamp 182 toward an incident surface of the light guide plate 160, thus improving light efficiency. The lamp reflection layer 185 is attached to the inner surface of the first lamp cover 302 by an adhesive. Alternatively, the lamp reflection layer 185 may be coated with a reflective material such as Ag or Al to enclose the inner surface of the first lamp cover 302. The second lamp cover 304 has the same structures as the first lamp cover 302. Therefore, repetitive descriptions will be omitted.

As shown in FIG. 3 and FIG. 8, the first to fourth opening portions 402, 404, 406 and 408 allow the lamp electrode line 183 connected to the lamp 182 to be exposed to an external circuit. The first opening portion 402 is exposed by a constant distance at an area in contact with the first lamp cover 302 and the first inner sidewall 312; the second opening portion 404 is exposed by a constant distance at an area in contact with the first lamp cover 302 and the second inner sidewall 314; the third opening portion 406 is exposed by a constant distance at an area in contact with the second lamp cover 304 and the second inner sidewall 314; and the fourth opening portion 408 is exposed by a constant distance at an area in contact with the second lamp cover 304 and the first inner sidewall 312. The lamp electrode lines 183 connected to the lamp 182 inserted into the first lamp cover 302 are exposed through the first opening portion 402 and the second opening portion 404. The lamp electrode lines connected to the lamp 182 inserted into the second lamp cover 304 are exposed at the third opening portion 406 and the fourth opening portion 408. Accordingly, the lamp electrode lines 183 may be easily moved and connected to an external circuit.

Figure 10:
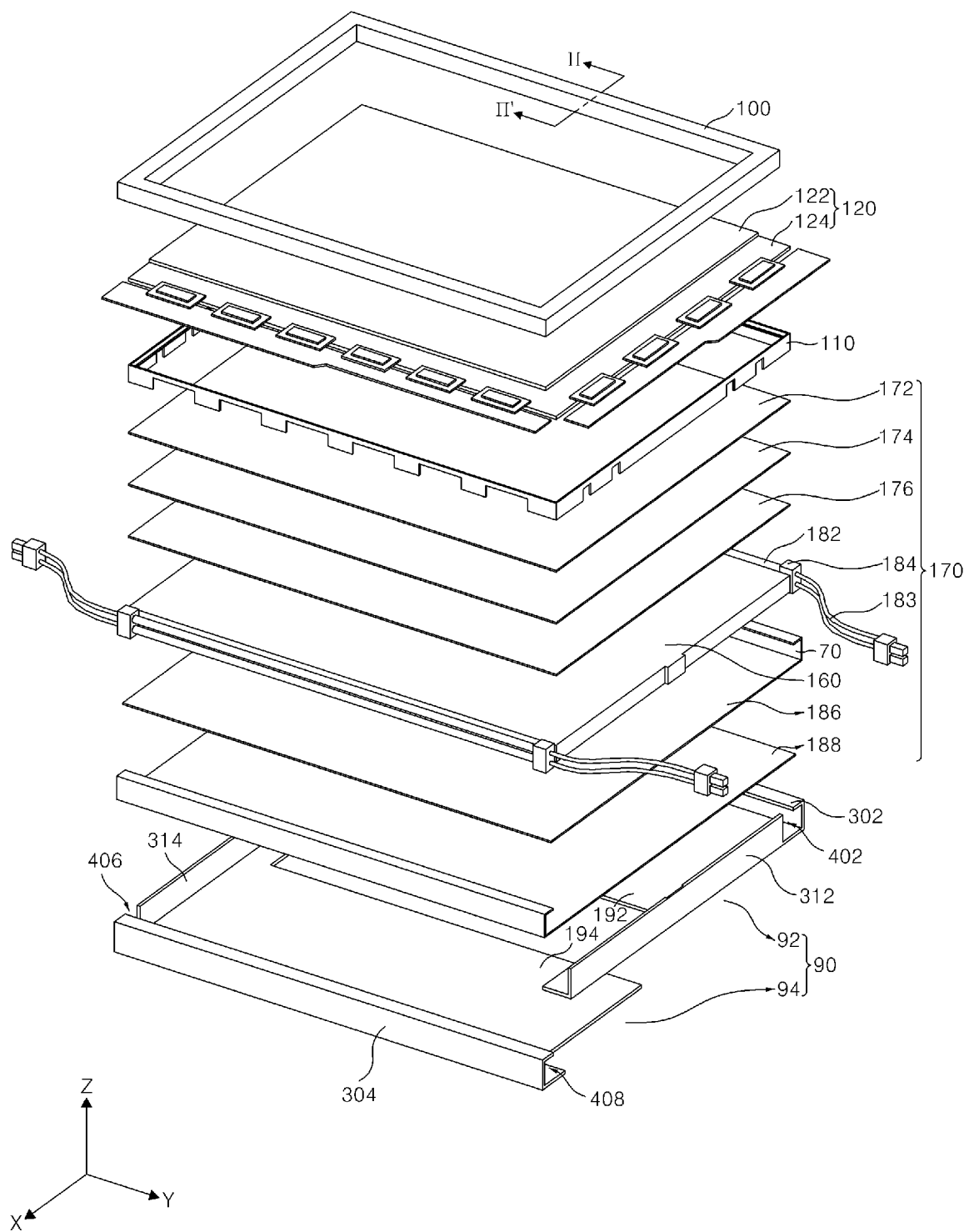
FIG. 10 is a perspective view showing an LCD device according to an exemplary embodiment of the present invention.
Figure 12:
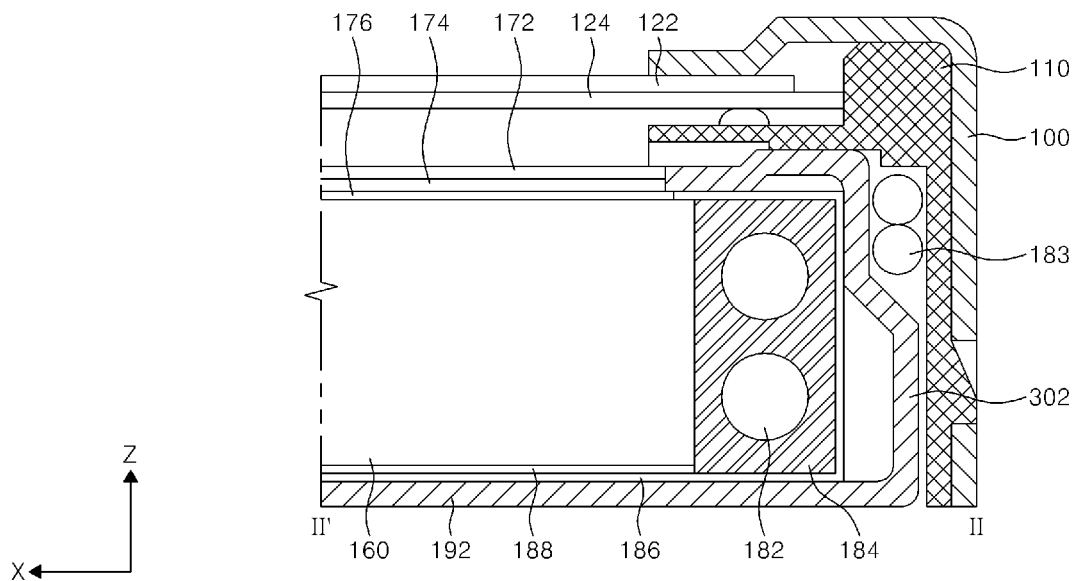
FIG. 12 is a cross-sectional view taken along line II-II' of FIG. 10.

FIG. 10 and FIG. 12 show a perspective view and a cross-sectional view, respectively, of the LCD device according to another exemplary embodiment of the present invention.

FIG. 10 and FIG. 12 are the same configurations as those of FIG. 1 and FIG. 2, except for the addition of a reflection sheet. Accordingly, any repetitive descriptions will be omitted.

The reflection sheet includes first and second reflection sheets 186 and 188 where the reflection sheet reflects light emitted to the lower portion of the light guide plate 160 back toward the light guide plate 160. For doing so, the first and second reflection sheets 186 and 188 may have a basic material coated with a material with high reflectivity. The basic material may be Al, PET, etc. and the reflective material may be Ag, Ti, etc.

Figure 11:
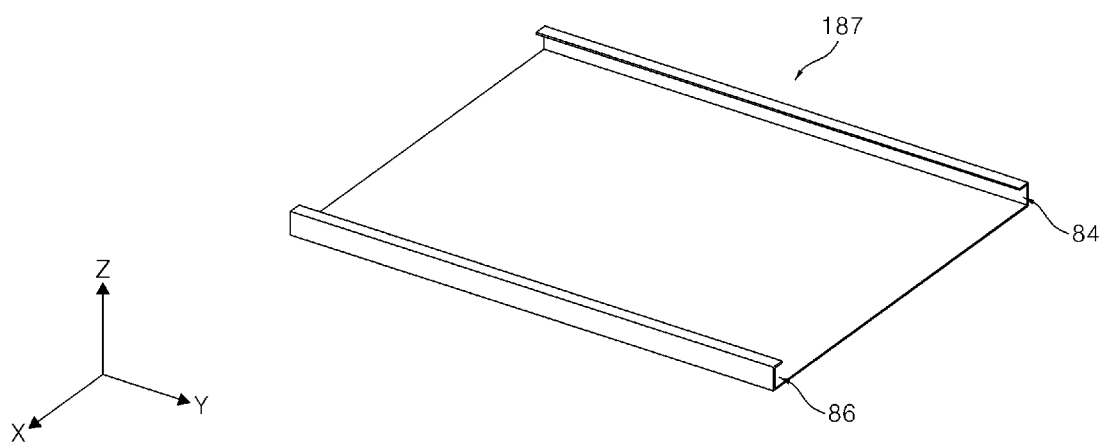
FIG. 11 is a graphical view showing a reflection sheet according to an exemplary embodiment of the present invention.

The first reflection sheet 186 is bent into a shape similar to the second lamp cover 304 and the second reflection sheet 188 is bent into a shape similar to the first lamp cover 302. The first reflection sheet 186 and the second reflection sheet 188 are stacked on the first lamp cover 302 and the second lamp cover 304 and reflect light generated from the lamp 182 back toward the light guide plate 160, thus improving light efficiency. Meanwhile, as shown in FIG. 11, a single reflection sheet 187 may be formed to have both ends 84 and 86 bent into a shape similar to the first lamp cover 302 and the second lamp cover 304 and to enclose the lamp 182.

Figure 13:
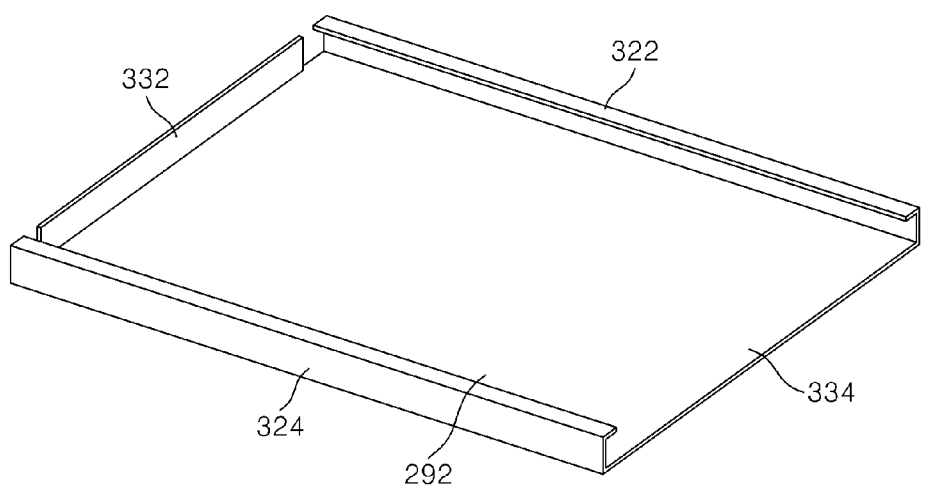
FIG. 13 is a graphical view showing a bottom chassis according to an exemplary embodiment of the present invention.
Figure 13:
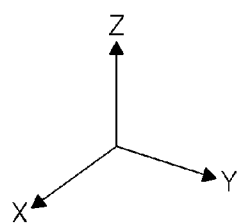

FIG. 13 shows a perspective view of a bottom chassis according to an exemplary embodiment of the present invention.

As shown in FIG. 13, the bottom chassis comprises an accommodating portion 292, an inner sidewall 332, first and second lamp covers 322 and 324, and a light guide plate inserting portion 334. The accommodating portion 292 and the inner sidewall 332 provide an accommodating space which may accommodate the light guide plate 160, the optical sheets 172, 174, and 176, and the reflection sheet 190. The first and second lamp covers 322 and 324 extend from both sides of the bottom chassis and are bent in a shape to enclose the lamp 182 fixed by the lamp holder 184 and the lamp reflection layer 185. The first and second lamp covers 322 and 324 are formed in a 'C' shape to accommodate the lamp 182 and the lamp reflection layer 185 in a 'C' shape. The light guide plate inserting portion 334 is formed to provide an open area facing the inner sidewall 332. Because the area corresponding to the sidewall 332 of the bottom chassis is open, the light guide plate 160, the optical sheets 172, 174, and 176, and the reflection sheet 190 may be easily accommodated.

As described above, the backlight assembly and the LCD device including the backlight assembly according to the present invention enclose the lamp by bending both sides of the bottom chassis and dividing the bottom chassis into the first and second bottom chassis. Accordingly, since an additional lamp cover is unnecessary, the present invention may reduce manufacturing costs and provide a slim, lightweight LCD device.

Although exemplary embodiments of the present invention have been described in detail hereinabove, it should be clearly understood that many variations and/or modifications of the basic inventive concepts taught herein, which may appear to those skilled in the present art, will still fall within the spirit and scope of the present invention. Thus, it is intended that the present invention cover the modifications and variations of this invention provided they come within the scope of the appended claims and their equivalents.

What is claimed is:

1. A backlight assembly, comprising:
a light source;
a light guide plate; and
a bottom chassis comprising an accommodating portion, a light source cover configured to accommodate the light source, a first sidewall, and a second sidewall, the accommodating portion comprising a first accommodating portion and a second accommodating portion detachably coupled with each other,
wherein the light source cover is formed on a first edge of the first accommodating portion, the first sidewall is formed on a second edge of the first accommodating portion, and the second sidewall is formed on an edge of the second accommodating portion,
wherein the first accommodating portion comprises a first mounting portion, the first mounting portion stepped and extended from the first accommodating portion in a single body such that a first stepped portion is formed at an area in contact with the second accommodating portion, and the second accommodating portion comprises a second mounting portion, the second mounting portion stepped and extended from the second accommodating portion in a single body such that a second stepped portion is formed at an area in contact with the first accommodating portion.

2. The backlight assembly of claim 1, wherein the first sidewall extends along the second edge of the first accommodating portion, and the second sidewall extends along the edge of the second accommodating portion.

3. The backlight assembly of claim 1, wherein the first edge of the first accommodating portion is perpendicular to the second edge of the first accommodating portion, and the edge of the second accommodating portion is perpendicular to the first edge of the first accommodating portion.

4. The backlight assembly of claim 1, wherein the first sidewall faces the second sidewall.

5. The backlight assembly of claim 1, wherein the first and second sidewalls are configured to block at least part of light emitted from the light source.

6. The backlight assembly of claim 1, wherein the first sidewall is formed integrally with the first accommodating portion, and the second sidewall is formed integrally with the second accommodating portion.

7. The backlight assembly of claim 1, wherein the first accommodating portion comprises a first extension area that extends from a body area thereof and along the first sidewall, and the second accommodating portion comprises a second extension area that extends from a body area thereof and along the second sidewall, and
wherein the first extension area is configured to fit with the body area of the second accommodating portion, and the second extension area is configured to fit with the body area of the first accommodating portion, when the first accommodating portion engages the second accommodating portion.

8. The backlight assembly of claim 1, wherein the accommodating portion is configured to accommodate the light guide plate.

9. The backlight assembly of claim 1, wherein the light source cover comprises a bent end to accommodate the light source and is formed integrally with the accommodating portion.

10. The backlight assembly of claim 1, wherein the first accommodating portion comprises a first tab configured to engage the second accommodating portion, and the second accommodating portion comprises a second tab configured to engage the first accommodating portion.

11. The backlight assembly of claim 1, wherein the bottom chassis is divided into a first bottom chassis and a second bottom chassis, the first bottom chassis comprising the first accommodating portion and the first sidewall, and the second bottom chassis comprising the second accommodating portion and the second sidewall.

12. The backlight assembly of claim 11, wherein the first bottom chassis comprises opening portions respectively separating the first and second sidewalls from the light source cover.

13. The backlight assembly of claim 12, wherein at least one of the first bottom chassis and the second bottom chassis comprises:
a mounting portion configured to overlap the second accommodating portion or the first accommodating portion;
two or more holes penetrating areas where the mounting portion overlaps the second accommodating portion or the first accommodating portion; and
a fastener configured to secure the second accommodating portion and the first accommodating portion together.

14. The backlight assembly of claim 1, further comprising:
an optical sheet located on an upper portion of the light guide plate; and
a reflection sheet located on a lower portion of the light guide plate,
wherein the reflection sheet comprises at least one sheet, each at least one sheet comprising at least one bent end.

15. The backlight assembly of claim 14, wherein the reflection sheet further comprises an extension portion with bent ends that enclose the light source.

16. The backlight assembly of claim 1, further comprising:
a light source reflection layer on a surface of the light source cover, the light source reflection layer configured to reflect light emitted from the light source toward the light guide plate,
wherein the light source reflection layer is attached to the surface of the light source cover with a reflective adhesive, and the light source reflection layer is coated with a reflective material.

17. A liquid crystal display device, comprising:
a liquid crystal display panel;
a driving circuit to drive the liquid crystal display panel;
a light source to provide the liquid crystal display panel with light;
a light guide plate to guide the light emitted from the light source toward the liquid crystal display panel; and
a bottom chassis comprising an accommodating portion, a light source cover configured to accommodate the light source, a first sidewall, and a second sidewall, the accommodating portion comprising a first accommodating portion and a second accommodating portion detachably coupled with each other; and
a top chassis enclosing edge portions of the liquid crystal display panel and covering side surfaces of the bottom chassis,
wherein the light source cover is formed on a first edge of the first accommodating portion, the first sidewall is formed on a second edge of the first accommodating portion, and the second sidewall is formed on an edge of the second accommodating portion,
wherein the first accommodating portion comprises a first mounting portion, the first mounting portion stepped and extended from the first accommodating portion in a single body such that a first stepped portion is formed at an area in contact with the second accommodating portion, and the second accommodating portion comprises a second mounting portion, the second mounting portion stepped and extended from the second accommodating portion in a single body such that a second stepped portion is formed at an area in contact with the first accommodating portion.

18. A backlight assembly, comprising:
a lamp;
a light guide plate configured to guide light emitted from the lamp;
an optical sheet disposed on the light guide plate; and
a chassis configured to accommodate the lamp, the light guide plate, and the optical sheet, the chassis comprising a first chassis and a second chassis,
wherein the first chassis and the second chassis are configured to be detachably coupled together such that an upper surface of the first chassis is coplanar with an upper surface of the second chassis, the coplanar upper surfaces forming an accommodating portion,
wherein the light source cover is formed on a first edge of the first chassis, the first sidewall is formed on a second edge of the first chassis, and the second sidewall is formed on an edge of the second chassis, and
wherein the first chassis comprises a first mounting portion, the first mounting portion stepped and extended from the first chassis in a single body such that a first stepped portion is formed at an area in contact with the second chassis, and the second chassis comprises a second mounting portion, the second mounting portion stepped and extended from the second chassis in a single body such that a second stepped portion is formed at an area in contact with the first chassis.

* * * * *